United States Patent [19]

Tidwell

[11] 4,074,456
[45] Feb. 21, 1978

[54] PEST TRAP

[76] Inventor: Robert Wayne Tidwell, 15330 Harding Lane, Leisure City, Fla. 33030

[21] Appl. No.: 733,320

[22] Filed: Oct. 18, 1976

[51] Int. Cl.² ............... A01M 1/22; A01M 23/38
[52] U.S. Cl. .................................. 43/98; 43/112
[58] Field of Search ..................... 43/98, 99, 112

[56] References Cited

U.S. PATENT DOCUMENTS

| 1,045,676 | 11/1912 | Clifford | 43/99 |
| 1,049,177 | 12/1912 | Vetterlein | 43/98 |
| 1,899,199 | 2/1933 | Kaiser | 43/98 |

FOREIGN PATENT DOCUMENTS

| 1,301,130 | 12/1972 | United Kingdom | 43/98 |
| 283,632 | 1/1928 | United Kingdom | 43/112 |

*Primary Examiner*—Warner H. Camp
*Attorney, Agent, or Firm*—Jack E. Dominik

[57] ABSTRACT

A trap containing a bait to attract rodents, insects and like pests comprising a box-shaped enclosure having a plurality of elbow configured passageways. A first open circuit powered by a voltage source is positioned within the enclosure so as to form a labyrinth of closely spaced electrical conductors which are disposed in partially surrounding relationship to the bait. The pest will detect the presence of the bait with the aid of a plurality of vents integrally formed within the walls of the enclosure. In pursuit of the bait, the pest upon entering the enclosure by means of the passageway, proceeds to trigger a tripper hingedly attached to the passageway which in turn activates a second open circuit mounted within the passageway, and thereby electrifies the retreating pest. If the pest does not retreat but proceeds toward the bait, it is electrocuted by the first open circuit.

7 Claims, 5 Drawing Figures

PEST TRAP

BACKGROUND OF THE INVENTION

1. Field of the Invention

The present invention relates to a trap for electrocution of rodents, insects and like pests.

2. Description of the Prior Art

Traps for rodents utilizing electrocuting of the same are known in the prior art. However, it has long been recognized that a problem exists concerning the safety of these various devices, many of which have conductive areas which are exposed so as to create the potential for shock to users or unaware persons or pets. Likewise, the devices of the prior art fail to be flexible to the extent of eliminating large pests such as rodents and also small pests such as insects. These inherent problems stated above in the devices of the prior art along with other problems have greatly dissuaded people from utilizing traps involving electrocution.

One such prior art devices utilizing electroduction is illustrated in U.S. Pat. No: 1,045,662, which discloses a trap having an electrocution area which is open, and therefore unsafe. This device also fails to disclose a structure suitable for the elimination of both insects and rodents, along with means for preventing a retreat. Other traps of the prior art having the same deficiencies are disclosed in U.S. Pat. Nos: 1,541,985; 2,440,214; 3,197,916; 3,468,054; 3,792,547; and 760,032.

Accordingly, it can be seen from the prior art that there is a need for a trap in which a variety of pests can be eliminated, a trap which is safe, a trap which has a high probability of electrocuting a pest before a successful retreat, a trap which avoids odors that may accumulate and therefore minimize the need for frequent inspections, and a trap which is simply structured to be efficient without sacrificing safety or increasing the expense involved in manufacturing and maintaining the trap.

SUMMARY

The present invention relates to a method and apparatus for eliminating rodents, insects and like pests. More specifically, the invention is directed to a trap having an enclosure with a bait placed therein and a plurality of nonlinear passageways which are mounted in the enclosure walls such passageways desirably take the form of elbow shaped tubular passages in the preferred embodiment. In addition, a plurality of vents are preferably integrally formed within the walls of the enclosure to allow the odors of the bait to pass from inside of the enclosure to the outside. The pest, upon detecting and being attracted by the odor of the bait, proceeds to enter the enclosure by means of the passageways. The passageways are preferably configured and dimensioned in the preferred embodiment so that the entering animal finds it difficult to turn around while remaining in the passageway. The retreat of the pest is further hampered by the lack of visibility of the entering opening of the passageway due to the elbow shaped configuration of the passageway. Upon proceeding from the passageway into the interior of the enclosure, the animal trips a tripper hingedly secured to the end of the passageway. This tripper upon being forcibly engaged by the pest activates an open circuit mounted within the passageway so as to prevent a successful retreat of the pest. The open circuit remains active despite the removal of the animal's weight from the tripper by means of a fastener which keeps the tripper in open circuit activating position. When the pest chooses to proceed toward the bait, it will then encounter another open circuit exposed in surrounding relationship to the bait. This open circuit is secured to the floor of the enclosure, and arranged so that conductors in the form of electrical wires of opposite polarity are in close adjacent relationship. As with the open circuit in the passageway, the pest upon simultaneously coming into contact with at least two conductors of opposite polarity will be electrocuted. Disposed in circuit breaking relationship to the voltage source is a safety shut off that will disconnect the two open circuits from the voltage source when the lid to the enclosure is opened.

The electrocution of the pest has the further advantage of mummifying the pest to the extent that little or no odor will be given off from a decaying pest, despite the fact that the pest may have remained in the enclosure for several days. This result is believed to flow from the process of electrocution and the charring of the rodent or roach, in which a modest degree of preservation occurs which reduces the odor of the decomposing pest.

One of the advantages of this trap device over the prior art, is the provision of several safety features. As described above, the passageway means are in the form of a curved elbow or S-shaped configuration. Such a configuration inhibits the fingers of small children, wires, forks, and other household items from being inserted to the point of penetrating the interior of the enclosure, therefore reducing exposure in normal usage to electrocution or shock to the unwary used. Additionally, as previously discussed, the trap device is equipped with a safety shutoff in the form of a plug and socket arrangement disposed in circuit breaking relationship between the open circuits and the voltage source. Upon opening the lid from its normally shut position the plug disengages from the socket, breaking the electrical connection to the voltage source. This allows for cleaning the electrocuted pests from the enclosure without incurring the risk of receiving the same fate as the pest.

A further advantage of this trap device over the prior art is its ability to successfully eliminate both insects, such as roaches, and rodents, such as rats or mice. This is accomplished by using a labyrinth arrangement or array of wire conductors arranged in close parallel relationship to each other at about one-sixteenth inch spacing. Such spacing is substantially close enough to allow for even relatively small insects to form a short circuit between two conductors of opposite polarity.

In view of the foregoing, it is the primary object of the present invention to provide a trap containing a bait therein to attract rodents, insects, and like pests in which the pests will be electrocuted.

A related object of the present invention is to provide a trap that reduces the odor of decomposing pests.

A further object of the invention is to provide a trap in which the previously electrocuted pest can be easily and safely removed therefrom.

A further object of the present invention is to provide a means for the entry of and the electrocution of pests while remaining safe for all other forms of animal life other than the pests.

A further object of the present invention is to insure that once the animal has entered the trap that electrocution is inevitable, regardless of whether the animal attempts to escape by retreat.

DESCRIPTION OF THE DRAWINGS

Further objects and advantages of the present invention will become apparent as the following description proceeds, taken in conjunction with the accompanying drawings, in which.

METHOD

Figure 1:
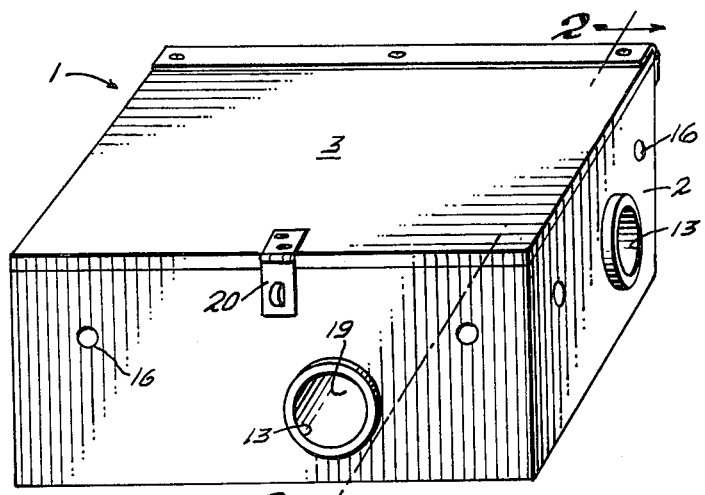
FIG. 1 is a perspective view of a trap illustrative of the present invention.

The present invention is directed to a method of eliminating rodents, insects and like pests having the step of placing a bait 28 within an enclosure or box 1 to attract the pest into entering the enclosure. A further step includes allowing the pest to enter by means of a plurality of elbow-shaped passageways 21. A further step includes activating a second open circuit 26 in the passageways after the pest has proceeded therethrough to prevent the pest from retreating. This step is further defined to include the steps of placing a tripper 11 in the path of a pest existing from the passageway and activating a second open circuit positioned in the passageway by allowing the animal to engage the tripper. The next step includes electrocuting the pest by placing a first open circuit 27 in the path the pest must take in order to reach the bait.

DETAILED DESCRIPTION OF A PREFERRED EMBODIMENT

Figure 3:
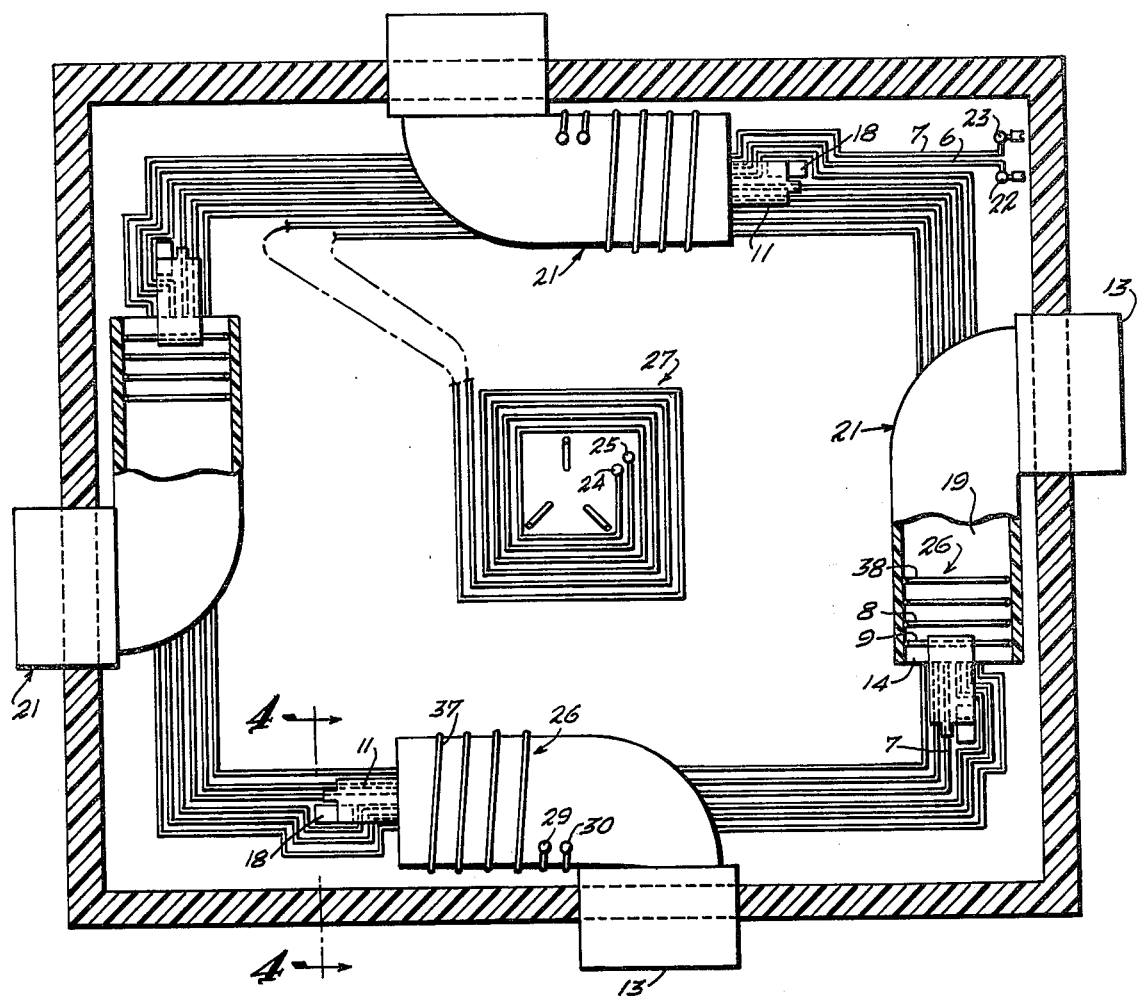
FIG. 3 is an enlarged cross sectional top view with two of the elbow passageways partially broken away.

A trap apparatus, generally indicated as 1 in FIG. 1, comprises an enclosure which, although capable of taking numerous configurations, is shown in the preferred embodiment of FIG. 1 as being a box 1. Mounted in each of the walls 2 of the box 1 is a plurality of non linear preferably elbow-shaped, passageway means 21 defining a tubular passage 19 wherein a pest can enter. The passageway means has an exterior opening 13 and an interior opening 14 dimensioned and configured to allow a pest to enter but, preferably at least in the case of a small rodent type pest, to prevent their turning about in the passage once the pest has entered. As can be seen in FIG. 3, the passageway means is curved so as to visibly distort the retreat path of the entered pest and thus, decreasing the chances of a successful retreat. Although only one passageway means is necessary, a plurality of passageway means are provided in the preferred embodiment to provide greater opportunities for the pest to enter.

As shown in FIG. 3, superimposed over the interior floor or bottom 4 of the box 1 of the preferred embodiment are two adjacent spaced-apart conductors of opposite polarity, first conductor 6 and second conductor 7, arranged in a rectangular labyrinth in a common plane disposed parallel to the floor. Therefore, a cross-section of this plane would show alternating conductors of different polarity in close parallel relationship relative to each other. Ideally, the adjacent conductors should be secured to the floor at distances of 1/16 inch from the next adjacent conductor, so that the pest will, upon proceeding out on the labyrinth of conductors, be likely to simultaneously engage conductors of opposite polarity as can be more clearly seen in FIG. 5, first conductor 6 and second conductor 7, respectively, begin at terminals 22 and 23 and end, respectively, at terminals 24 and 25. Impressed across terminals 22 and 23 is a electromotive force of sufficient voltage, such as a common 120 or 220 house voltage, to kill a pest. The other ends of the two conductors form an open circuit relative to each other. If the pest makes contact with at least two conductors of opposite polarities, the pest will short circuit the previously open circuit, resulting in a very rapid electrocution of the pest. Sample test cases utilizing this apparatus have lead to the discovery that normally a small rodent will only conduct electricity for a period of time not much greater than 30 seconds whereupon the resistivity of the rodent will increase to the point where once again there is an open circuit between first conductor 6 and second conductor 7.

As shown in FIG. 3, positioned partially within the tubular passage 19 of the elbow passageway means 21 is a third and fourth conductor 8 and 9 respectively which are of opposite polarity. The third conductor 8 is electrically interconnected to terminal 22 by way of the first conductor 6 and terminates at the other end of terminal 29. The fourth conductor is electrically connected to a tripper 11 and extends to and terminates at terminal 30. This second set of conductors, conductors 8 and 9, are disposed in spaced apart, close proximity relationship relative to each other at the inner extremity of the passageway means 21. The second set of conductors are formed into loops with the lower portion 38 of the loop being mounted on the interior of the passageway means and the upper portion 37 of the loop being arranged on the outside of the passageway means. Thus, the pest in proceeding down the passage will come into contact with the lower portion 38 and if the pest attempts to gain refuge by situating itself on top of the passageway means, then it will encounter the upper portion 37 of the loops. Further up the passageway means, the loop arrangement can be terminated, leaving the two conductors to be wrapped in a helical manner around the exterior of the passageway means, as shown in FIG. 5.

Figure 4:
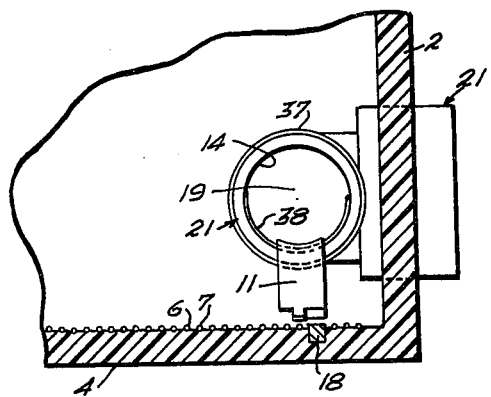
FIG. 4 is an enlarged broken sectional view of the trap, illustrating the tripper and interior opening of the elbow passageway, taken along section line 4—4 in FIG. 3 with an enlarged scale.

As shown in FIG. 4, tripper 11 is in the form of a paddle or lever which is pivotally secured by a coil spring to the rim of the interior portion of the elbow passageway means 21. Positioned directly below the tripper is the second conductor 7. In its normal position, the tripper is in spaced apart disposition relative to the second conductor. When the weight of the pest is exerted in a downward force upon the tripper, the tripper will rotate in a downward direction about its secured axis and electrically engage the second conductor 7. In so doing, the fourth conductor is now electrically connected to terminal 23, results in there being an open circuit between terminals 29 and 30. Once the tripper device is electrically interconnected to terminal 23 it is kept in its triggered position by a fastening means, such as a magnet 18. One possible design of this fastening arrangement is shown in the preferred embodiment in FIG. 1 in which the magnet is disposed in a position slightly lower than the second conductor 7 so the tripper 11 will not be prevented from coming into contact with the second conductor 7. However, the magnet 18 is placed sufficiently close to the trigger 11 when it is in its tripped position that a magnetic field will have the strength to maintain it in its tripped position. The specific construction of the fastener for the tripped to perform the above-described function may be of any conventional design and per se forms no part of the present invention.

As with the first set of conductors 6 and 7, the second set of conductors 8 and 9 are placed in spaced-apart close proximity relative to each other with a potential difference impressed therebetween equal to the impressed EMF. As the pest proceeds through the elbow passage means 21 and activates the second set of conductors by placing his weight on the tripper, the pest may then try to retreat back up the tubular passage 19. With the magnet 18 retaining the tripper 11 to keep the two conductors in the passageway activated, the pest in attempting to retreat will encounter the open circuit created between the third and fourth conductors 8 and 9. Therefore, upon contact with any two wires of opposite polarity, the pest will be killed in his attempt to retreat. On the other hand if the pest proceeds forward out of the passageway means 21 and onto the floor of the box 1, then he will be likewise electrocuted there.

Figure 5:
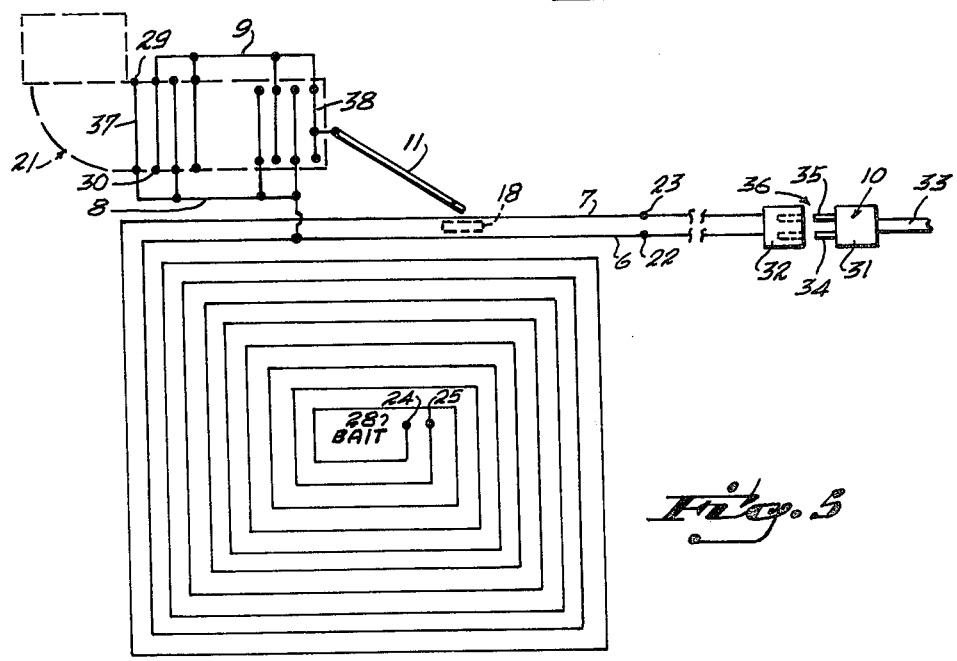
FIG. 5 is a schematic of the electrical circuits of the present invention.

As illustrated in FIG. 5, positioned substantially in the center of the labyrinth of conductors arranged on the floor is a bait 28 of a type found desirable and attractible to the pest which plagued the user of the apparatus. By positioning the bait in substantially the center of this array of oppositely charged conductors the pest must cross thereover in order to reach the bait. This will result in his electrocution due to the close proximity of the wires which will assure contact with wires of opposite polarity. To facilitate this attraction of the pest to the bait, a plurality of vents 16 are intregally formed within the walls 2 of the box 1. These vents allow the odor of the bait to permeate outward from the box to the area surrounding the box so as to enhance the chances of the pest being attracted thereto.

Figure 2:
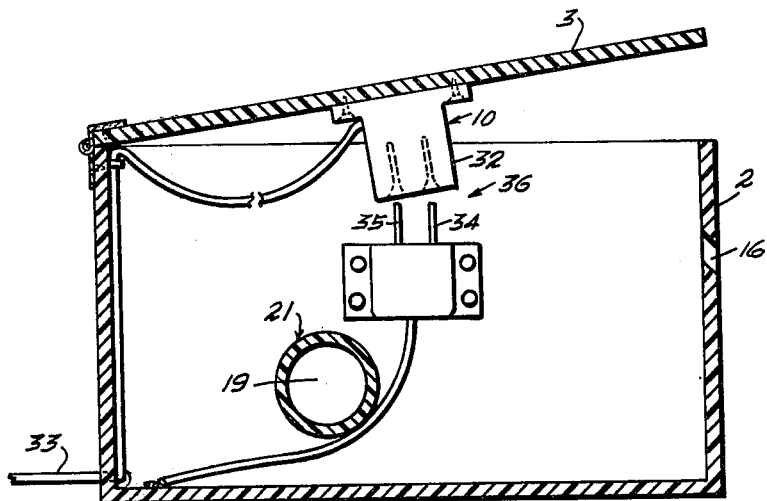
FIG. 2 is an enlarged transverse sectional view of the trap in FIG. 1 taken along section line 2—2 in FIG. 1 in somewhat enlarged scale.

Although the enclosure of the preferred embodiment is shown as a box-like enclosure, any shape of the enclosure which serves the purpose of preventing the escape of the pest will properly fall within the scope of the present invention. As illustrated in FIG. 1 and FIG. 2 in the preferred embodiment the box 1 is provided with a top or lid 3 which has an open and close position with one side hingedly secured to the upper rim of one of the walls 2 with the opposite side of the lid 3 having an attachment means, such as a latch 20, mounted thereon. When the trap is set and awaiting the arrival of the pest the lid will be in locked relation to the box 1. Upon the successful electrocution of one or more pests the lid can be unattached and the remains of the electrified pests removed therefrom.

The previously described passageway means 21, which is formed in a curved elbow or S-shaped configuration, has the safety feature of preventing fingers and other household objects from being inserted therein. Therefore, the possibility of shock to an entity other than the pest is greatly reduced. As illustrated in FIG. 2, another safety feature of the trap is in the form of a safety shutoff connection 36 having a plug 31 and a socket 32. Upon opening the lid 3 from its normally shut position, the plug 31 disengages from the socket 32, breaking the electrical connection with a voltage source 33. The voltage source 33 would be electrically connected by first terminal 34 to terminal 22 and by the second terminal 35 to terminal 23 so as to provide an impressed EMF to first and second open circuits 26 and 27 when the lid 3 of the box 1 is closed.

The trap can be suitably placed either on the floor, or in spaced off relationship to the floor, and can quite conveniently serve a secondary purpose of being a supporting structure for a garbage can, a fish aquarium, a night light, or a host of other appliances placed on top thereof.

In that the interior of the box 1 contains a plurality of active conducting elements, the basic structure of the box must at least in part be made of nonconductive materials. In the preferred embodiment, the box like enclosure 1 should preferably have a base or bottom 4 made of asbestos or some other dielectic material. In general, the entire box will be made of such materials with the conductive elements secured thereto.

In operation, a bait is placed in the box 1 in a manner requiring the pest to come into contact with at least two wires of opposite polarity. The pest will sense or smell the bait within the trap and will enter the trap through the only means available, the elbow passageway means 21. Since the elbow is configured and dimensioned to such a size that it will be difficult for the pest to turn around it will be forced to proceed through the passage 19 into the interior of the box. Upon exiting from the elbow, the pest will trigger the tripper 11 so that the oppositely charged conductors 8 and 9 positioned within the elbow will be activated. At this positioning the pest, although it is possible for the pest to turn around and proceed back up the elbow, the pest will now find an activated open circuit in the elbow that will electrify it. Alternatively, the pest may proceed out onto the floor and arrive at the same fate, electrocution. In addition, any retreat is hampered by the pest not visually being able to see from the interior to the exterior of the passageway due to the elbow configuration thereof. Finally, the pest will conduct electricity forming a short circuit for a period not much greater than 30 seconds. Thereafter an open circuit will again be formed which in essence re-sets the trap for the next pest. Since a plurality of elbows exist in the present invention, those that have not had a pest enter will still have their trippers 11 in their normal position so as to activate the open circuits within the elbows upon the entry of a pest. Thus, the device can accomodate numerous pests without the need of resetting the trap. The trap can be cleaned of the executed pest by opening the lid 3 and dumping the electrocuted remains therefrom.

It is therefore appreciated that all of the above objects and advantages, as well as additional objects and advantages have been accomplished and provided by means of the trap depicted herein, and the various embodiments.

While there has been described what is at present to be considered to be the preferred embodiment of the invention, it will be understood that various modifications may be made therein and it is intended to cover in the appended claims all such modifications as fall within the true spirit and scope of this invention.

What is claimed is:

1. A trap apparatus containing a bait to attract rodents, insects, and like pests, comprising:
   an enclosure;
   means for entry into said enclosure;
   a source of electricity;
   a first open circuit powered by said source of electricity positioned within said enclosure and disposed in surrounding relationship to the bait, whereby the pest must engage said first open circuit to reach the bait;

a second open circuit mounted within the interior of said entry means;

a tripper yieldably attached to said entry means;

said tripper disposed for electrical activation of said second open circuit upon receiving the weight of the pest, whereby the pest must engage said second open circuit to retreat up said entry means.

2. A trap apparatus as claimed in claim 1 further compromising;

a safety shut-off connection disposed in circuit deactivating relationship between said source of electricity and said first and second open circuits.

3. A trap apparatus as claimed in claim 1, said second open circuit includes third and fourth electrical conductors aligned in spaced apart close proximity relationship relative to each other;

said voltage source including a first and second terminal;

said third conductor electrically connected to said first terminal of said source of electricity;

said fourth conductor electrically connected to said tripper;

said tripper having a normal position in which said tripper is electrically disengaged from said second terminal of said source of electricity and a tripped position in which said tripper is disposed in electrical interconnection with said second terminal of said source of electricity upon receiving the weight of the pest;

fastener means mounted to the bottom of said enclosure and aligned for locking engagement with said tripper when said tripper is in its tripped position.

4. A trap apparatus as claimed in claim 3, said means for entry into said enclosure comprises at least one elbow shaped passageway means mounted in the wall of said enclosure for the pest to enter said enclosure.

5. A trap apparatus as claimed in claim 4, said first open circuit including a first and second electrical wire conductor mounted on the floor of said enclosure and aligned in continuous rodent and insect killing spaced relationship relative to each other;

said first conductor electrically connected to said first terminal of said source of electricity;

said second conductor electrically connected to said second terminal of said source of electricity;

said first and second conductors disposed in repeated wrap-around surrounding relationship relative to the centrally located bait with each successive wrap of said conductors having a smaller perimeter.

6. A method of eliminating rodents, insects, and like pests including the steps of:

placing a bait within an enclosure to attract the pest into entering the enclosure;

inviting the pest to enter by means of at least one non-linear shaped passageway; and activating a second open circuit in the passageway after the pest has entered the same to prevent the pest from retreating up the passageway;

electrocuting the pest by placing a first open circuit in the path the pest must take in order to reach the bait.

7. In the method of claim 6, the step of activating a second open circuit further defined to include the steps of placing a tripper in the path of the pest exiting from the passageway, and activating a second open circuit positioned in the passageway by allowing the pest to engage the tripper.

* * * * *